(12) United States Patent
Olmstead

(10) Patent No.: X4824
(45) Date of Patent: Jul. 21, 1827

(54) GAS LIGHT, FROM COTTON SEED

(76) Inventor: Denison Olmstead

Denison Olmsted of New Haven, Connecticut,

Letters Patent,

The schedule referred to in these Letters Patent, and making
part of the same, containing a description in the words of the
said Denison Olmsted himself of his improvement in the
manufacture of gass lights from cotton seed. —

To all to whom these presents shall come
Be it known that I Denison Olmsted of the City of New
Haven & State of Connecticut, have invented or discovered
a new and useful improvement in the manufacture of
gas, to be used for the purpose of illumination, in the
form known under the name of gaslights; for which purpose I
employ an article or substance which has not heretofore been used
for that purpose. for which discovery & improvement I claim
a patent according to the laws of the united States And I the said Denison Olmsted do hereby declare
that the nature of my said discovery & improvement and the man
ner in which the same may be carried into effect are fully made
known in the following description or specification The material which I employ & the use of which I claim as
my discovery, is the seed of the cotton plant. This after being
dried or roasted for the purpose of expelling the watery par
ticles, I put into a retort or other recipient similar to those
used for making of gas lights, from coal, tar or other, substance
in which it is heated to a degree sufficient to convert the oily
matter of the seed into vapour, which vapour before it escapes
from the recipient into the gasometer is converted into a
permanently elastic fluid by being made to pass over an
ignited surface either of metal, anthracite, fragments
of Brick, or other substance, in the way adopted in the making of gas from oil or other substance. —

In the conversion of the oily matter of cotton seed into gas I do not specify any particular form of apparatus that al ready in use, being sufficient for the purpose, but I do claim as my exclusive right, the employment of cotton seed for the production, by destructive distillation and in a manner adap ted to public use, of a permanently elastic & highly illumi -nating gas; the same being my invention or discovery and not heretofore practised or known, Denison Olmsted Witnesses
Chas. Bostwick
Anthony Stow. Jr.

[4824]

Exd
N.G.C.